United States Patent [19]
Gregerson et al.

[11] 3,722,537
[45] Mar. 27, 1973

[54] SIGHT GLASS

[75] Inventors: David A. Gregerson, Richmond; Gerald J. Selm, Connersville, both of Ind.

[73] Assignee: Philco-Ford Corporation, Philadelphia, Pa.

[22] Filed: Apr. 8, 1971

[21] Appl. No.: 132,313

[52] U.S. Cl. ...................137/559, 73/323, 73/331, 222/159, 116/117
[51] Int. Cl. ................................................G01f 23/02
[58] Field of Search ..137/559; 73/29, 323, 330, 331, 73/332, 334; 222/156, 159; 116/117

[56] References Cited

UNITED STATES PATENTS

| | | | |
|---|---|---|---|
| 3,000,345 | 9/1961 | Gray, Jr. et al. | 73/323 X |
| 3,299,851 | 1/1967 | Olsen | 73/323 X |
| 2,744,487 | 5/1956 | Moore et al. | 116/117 R |
| 2,933,060 | 4/1960 | Yocum | 73/323 X |
| 2,946,156 | 7/1960 | Bailey | 116/117 X |

Primary Examiner—William R. Cline
Attorney—Robert D. Sanborn

[57] ABSTRACT

A sight glass to permit observation of refrigerant flowing in a refrigeration system. The glass is installed directly in the refrigerant flow line, rather than in a coupling or component connected into the line.

5 Claims, 6 Drawing Figures

PATENTED MAR 27 1973　　3,722,537

INVENTORS
DAVID A. GREGERSON
GERALD J. SELM
BY
Carl H. Synnestvedt
AGENT

SIGHT GLASS

BACKGROUND OF THE INVENTION

Certain liquid flow systems, particularly air conditioning systems installed in automobiles, commonly include an indicator or sight glass through which it is possible to observe the refrigerant flow to determine the conditions prevailing in the system, particularly the loss of charge. Generally such sight glasses have comprised a relatively expensive separate coupling or component fastened into a refrigerant line. Frequently such components have been threaded at both ends to provide the required hermetic coupling into the line. Such components, while generally reliable in operation, are excessive in cost, tend to be bulky, and necessitate expensive and time consuming assembly operations, especially in the establishment of the necessary hermetic seals.

SUMMARY OF THE INVENTION

It is our objective to provide an extremely simple sight glass arrangement which is of very low cost and which eliminates two hermetic seals by providing for placement of the sight glass directly and reliably into the refrigerant line, without resort to separate components and coupling connections.

In the achievement of this general objective we place over the line a small saddle-like structure. One end of this structure comprises an open tube which serves as a dam to retain, shroud, and protect a body of glass which is received therein and extends within and is sealed in an aperture provided in the side wall of the refrigerant line.

It is a feature of our invention that this saddle-like structure can be made in very simple and convenient manner, comprising nothing more than a tubular branch fitting of known type which has an opening which extends completely therethrough, in the direction of the diameter of the tubular fitting, and is of a size to receive the flow tube, which passes snugly through the opening in the fitting. A body of molten transparent material, preferably glass, is introduced into the open end of the branch fitting and this body protrudes through a suitable opening in the refrigerant line and solidifies to form a lens permitting visual observation of the action of the refrigerant within the tube. It is another feature of our invention that the glass seals itself within the tube and no hermetic seal is required between the refrigerant tube and the branch fitting, or between the glass and the fitting. Further, as will be understood, since the glass is placed directly in the refrigerant line, all coupling connections and seals are eliminated.

BRIEF DESCRIPTION OF THE DRAWING

In the accompanying drawing, which is on a somewhat enlarged scale.

DETAILED DESCRIPTION OF THE ILLUSTRATED EMBODIMENT

Figure 1:
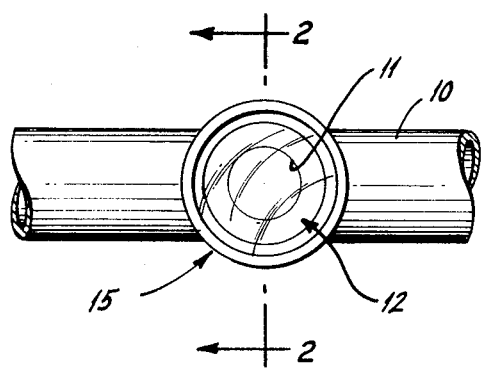
FIG. 1 is an elevational view of a section of flow tubing, for example refrigerant flow tubing, having incorporated in the wall thereof a sight glass in accordance with this invention.
Figure 2:
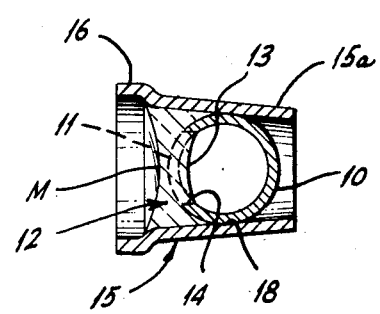
FIG. 2 is a sectional view taken along the line 2—2 applied to FIG. 1.

First making reference to FIGS. 1 and 2, there is illustrated a section of liquid flow tubing 10 which may, for example, comprise ⅜ inch outside diameter steel tubing of a kind commonly used in automobile air conditioning systems. As shown at 11, this tubing has an opening in the side wall thereof at a position convenient for observation. In the illustrated embodiment the opening 11 has a diameter of about one-fourth inch. A sight glass 12 is sealed directly in the tubing 10, in the manner described below, and protrudes within the hole 11, as shown at 13, seals against the walls defining said opening, as at 14, and provides a lens accommodating visual observation of the refrigerant or other liquid passing through the tubing 10.

In particular accordance with our invention, a fitting 15 of a type usually used to form branch connections, is used in novel manner to provide a saddle structure the upper flared end 16 of which serves as a dam which retains the body of glass during solidification of the lens, and protects and shrouds the latter during use. In the described embodiment of our invention, the fitting 15 comprises ½ inch outside diameter (0.049 inch wall) seamless, annealed steel tubing.

Figure 3:
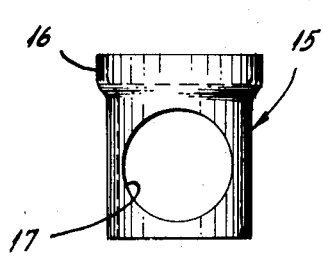
FIG. 3 is an elevational view of the branch fitting or saddle, prior to association of the refrigerant flow tube therewith.
Figure 4:
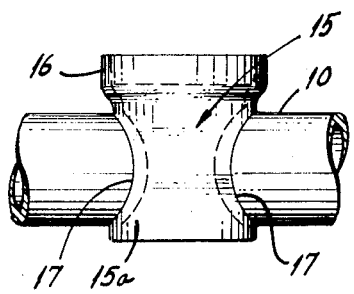
FIGS. 4 and 5 are elevational views showing the refrigerant flow tube and fitting assembly prior to a certain crimping step.
Figure 5:
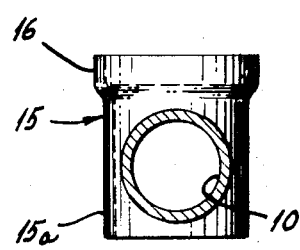

To accommodate association of tubing section 10 and fitting 15, to form the dam structure, the fitting 15 is provided with opposed apertures 17 (FIGS. 3 and 4) within which the refrigrant flow tube 10 is snugly received. After the latter tubing is in place, as shown in FIGS. 4 and 5, and prior to application of the glass, the fitting 15 is crimped toward its end 15a, which is the end opposite the flared end 16, until the tubing 15 lies closely along and contacts the side walls of the tubing 10, as shown at 18 in FIG. 2. This crimping fixes the fitting in proper position on the tube 10. After the crimping operation it is a simple matter to introduce the molten glass and form the sight glass or lens 12. This glass fills the space between the inside surfaces of fitting 15 and the adjacent exterior surfaces of tube 10 and hardens in said space, serving as a bonding material further securing the fitting to the tube. As indicated above, the glass protrudes into the hole 11 and forms menisci which appear in FIG. 2, see for example the meniscus shown at M. If desired, the curvature of the menisci can be controlled using techniques well known in the art.

In summary, the fitting 15 retains the glass during cooling thereof, prevents loss of glass downwardly along the exterior sides of the flow tubing 10 and protects the glass when the apparatus is in use.

Figure 6:
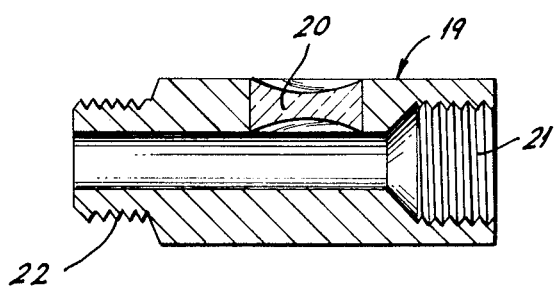
FIG. 6 is a sectional view illustrating a sight glass coupling of a type common in the prior art.

The simplicity of the integrally formed sight glass which we provide may best be appreciated by reference to FIG. 6, which illustrates a sight glass coupling 19 representative of a type indicator which has been used in the art. As shown in FIG. 6 this prior art coupling includes not only the glass body forming lens 20, which is hermetically sealed within an aperture provided in the side wall of the coupling, but also includes internally and externally threaded end portions shown at 21 and 22, respectively, each of which adds to the expense of the fitting and necessitates formation of an additional hermetic seal, when the coupling is mounted in a flow line. Frequently such couplings have comprised forged or cast bodies to which machining operations have been applied to form the screw threaded connections. Evidently such apparatus is far more complicated and costly than the simple, reliable, sight glass arrangement of this invention.

We claim:

1. Means for providing visual indication of fluid flow, comprising: a pipe through which fluid normally flows and having a laterally presented opening provided in and extending through a portion of the wall thereof; a body of transparent material extending across the outside surface of said pipe adjacent said opening and including a portion extending within said opening into direct contact with surface portions defining the opening, to close and seal the latter; and means carried by exterior surface portions of said pipe and comprising a wall disposed adjacent to and defining the limits of extension of said body across the surface of said pipe.

2. Apparatus in accordance with claim 1, and further characterized in that said pipe normally contains liquid, and said body of transparent material comprises glass.

3. In combination with fluid flow means including a line through which liquid refrigerant normally passes, and which line has a laterally presented opening provided in the wall thereof, a refrigerant flow indicator comprising: a body of glass mounted directly within and sealing said opening and having lateral edges extending across portions of the exterior surface of said line adjacent said opening; and a saddle-like member supported across the refrigerant line and including a wall closely surrounding said lateral edges of said body of glass to define the extent of the body and protect the same.

4. A combination in accordance with claim 3, and further characterized in that said saddle-like member comprises a short section of metal tubing through which the refrigerant line passes in the direction of the diameter of the tubing, said line being snugly received therein.

5. In combination with an extended conduit comprising the liquid line of a refrigerating system, and having a laterally presented opening provided in the wall defining said line, sight glass means comprising a body of transparent material extending within and sealing said opening and accommodating visual observation of the refrigerant passing through the line, and means carried by said liquid line exteriorly of the latter and comprising wall structure defining a dam disposed to surround said opening and confine and protect said body of transparent material, said last means comprising a short section of tubing through which said liquid line passes in the direction of the diameter of said tubing, one end portion of said section of tubing being flared to define said dam, and said tubing section being crimped toward the opposite end portion thereof to fix the tubing on said line and cause interior side wall portions of the tubing to contact opposed exterior side wall portions of the refrigerant line.

* * * * *